United States Patent [19]

Moon et al.

[11] Patent Number: 5,926,608
[45] Date of Patent: Jul. 20, 1999

[54] MULTI-PICTURE PROCESSING DIGITAL VIDEO DISC PLAYER

[75] Inventors: Sung-Jin Moon; Young-Ki Byun, both of Seoul, Rep. of Korea

[73] Assignee: Samsung Electronics Co., Ltd., Kyungki-Do, Rep. of Korea

[21] Appl. No.: 08/865,839

[22] Filed: May 30, 1997

[30] Foreign Application Priority Data

Sep. 25, 1996 [KR] Rep. of Korea ...................... 96-42651

[51] Int. Cl.⁶ ................................................... H04N 7/08
[52] U.S. Cl. ............................ 386/108; 386/95; 386/125; 386/126
[58] Field of Search .................................. 386/36, 45, 95, 386/105–106, 108, 122, 125–126; 360/22–23; H04N 7/08

[56] References Cited

U.S. PATENT DOCUMENTS

| | | | |
|---|---|---|---|
| 5,371,602 | 12/1994 | Tsuboi et al. ............................ | 358/335 |
| 5,596,564 | 1/1997 | Fukushima et al. .................. | 369/275.1 |
| 5,666,451 | 9/1997 | Kim ............................................ | 386/97 |
| 5,701,385 | 12/1997 | Katsuyama et al. .................... | 386/106 |
| 5,712,950 | 1/1998 | Cookson et al. ......................... | 386/97 |
| 5,745,643 | 4/1998 | Mishina .................................. | 386/106 |
| 5,778,142 | 7/1998 | Taira et al. ............................... | 386/97 |
| 5,784,519 | 7/1998 | Hirayama et al. ....................... | 386/92 |

*Primary Examiner*—Wendy Garber
*Assistant Examiner*—Vincent F. Boccio
*Attorney, Agent, or Firm*—Sughrue, Mion, Zinn, Macpeak & Seas, PLLC

[57] ABSTRACT

The digital video disc player receives multiple picture information and information for selecting the output mode for the pictures, and reads location information for the selected pictures on the digital video disc with an optical pick-up. When the optical pick-up reads picture information recorded at the specified location and outputs the read picture information in series, the digital video disc player separates the picture information in parallel, reproduces the separated picture information, and then converts the reproduced picture information into an analog picture signal according to an output mode selected by a user.

5 Claims, 5 Drawing Sheets

MULTI-PICTURE PROCESSING DIGITAL VIDEO DISC PLAYER

BACKGROUND OF THE INVENTION

1. Field of the Invention

The present invention relates to a digital video disc player and, more particularly, to a digital video disc player which is operable to simultaneously produce more than one picture from a digital video disc on which multiple pictures are recorded.

2. Description of the Related Art

In digital video discs, picture information produced by coding photographed pictures at- various angles is recorded so that users can display or reproduce pictures in vivid detail. A digital video disc player reads and reproduces picture information previously recorded on a digital video disc. FIG. 1 shows a block diagram of a conventional digital video disc player. Referring to FIG. 1, a controller 10, which can take the form of a microcomputer, controls a servo controller 14 and data controller 20 according to signals from a user interface 12. Controller 10 displays a menu by which users can control various functions of the video disc player and make picture selections using interface 120 The selected picture signals are provided on an output device 32. Here, the user can select a picture photographed at a predetermined angle from those pictures recorded at various angles onto the disc.

Servo controller 14 receives optical pick-up driving information from controller 10, and operates an optical pick-up 160 Optical pick-up 16 reads information recorded on a digital video disc 18 under the control of servo controller 140 Digital video disc 18 contains servo information and picture information coded in moving picture experts group-2 (MPEG-2) format. The servo information includes information indicating where the picture information is recorded on the disc.

Servo controller 14 reads selected picture location information and operates optical pick-up 16 to transmit picture location information to controller 10. Controller 10 sends the picture location information to data controller 20, and transmits instructions for reading the picture location information to servo controller 14. Optical pick-up 16 reads the picture information from digital video disc 18 under the control of servo controller 14 in accordance with the reading instruction The coded picture information is sent to data controller 20.

Data controller 20 transfers the coded picture information to a video decoding portion 26 when the picture location information of controller 10 corresponds to the recording location of the picture from optical pick-up 16. Video decoding portion 26 consists of an input buffer 22 and a video decoder 24, which uses conventional techniques we to decode data stored in MPEG-2 format Input buffer 22 buffers the picture information while the buffered picture information is being sent to video decoder 24. Video decoder 24 reproduces the buffered picture information, and the reproduced picture information is transmitted to a reproduction picture buffer 28. Reproduction picture buffer 28 buffers the reproduced picture information, which is then fed to an output controller 30. Output controller 30 converts the reproduced picture information into an analog picture signal, that is then reproduced by output device 32 as a picture. The output device 32 conventionally is a television set.

FIG. 2 shows a process of reproducing a picture with the aforementioned conventional digital video disc player.

Referring to FIGS. 1 and 2, the user selects a predetermined picture from pictures stored at various angles on digital video disc 180 The picture selection is performed through user interface 12. The selected picture is referred to as a first picture for convenience When the first picture is selected through user interface 12, controller 10 performs a step 34. At this step, controller 10 receives picture selection information corresponding to the selection of the first picture through interface 12. When step 34 is completed, controller 10 performs a step 36. At this step, controller 10 reads picture location information indicating where the coded first picture is recorded on digital video disc 18.

Next, the structure of data recorded on digital video disc 18 will be described with reference to FIG. 3 showing the recording format of digital video disc 18. The picture location information section consists of a first picture information block, second picture information block, third picture information block, . . . , and continues through the Nth picture information block. As shown in FIG. 3, if the first picture information is recorded in a sector L, information regarding sector L is stored in the picture location section corresponding to the first picture. If the second picture information is recorded in a sector M, sector M is recorded in the second picture location information section. Furthermore, If the third picture information is recorded in a sector N, sector N is recorded in the third picture location information section.

In order to determine the location of the first picture information, controller 10 generates an optical pick-up driving control signal for servo controller 14, which instructs servo controller 14 to read the first picture location information section. Servo controller 14 controls optical pick-up 16 according to the optical pick-up driving control signal. Optical pick-up 16 reads the location for the first picture location information section under the control of servo controller 14. The read first picture location information is sent to controller 10.

Then, controller performs a step 38. At this step, controller 10 sends the optical pick-up driving control signal to servo controller 14 according to the first picture location information Servo controller 14 controls optical pick-up 16 according to the optical pick-up driving control signal Optical pick-up 16 reads the location where the first picture information is recorded, that is, reads the picture information recorded in sector L under the control of servo controller 14. The read first picture information is sent to data controller 20. When the read operation of optical pick-up 16 is completed, controller 10 performs a step 40. At this step, controller 10 sends the first picture location information to data controller 20. That is, information about sector L is sent to data controller 20. By doing so, the operation of the controller is accomplished.

If the recording location of the first picture information obtained by optical pick-up 16 corresponds to the first picture location information from controller 10, data controller 20 transmits the first picture recording location information to video decoder 26. If not, data controller 20 ignores it. Picture information sent to video decoder 26 is reproduced as a picture which is displayed by output device 32, after passing through reproduction picture buffer 28 and output controller 30.

With the above-described conventional video disc player, the user cannot display a first and second picture simultaneously. This is because a conventional digital video disc player can process information of only a single picture at a time. Accordingly, the user cannot watch multiple pictures simultaneously.

SUMMARY OF THE INVENTION

An object of the present invention is to provide a processing digital video disc player that can process multiple pictures to allow a user to watch multiple pictures simultaneously.

The digital video disc player of the present invention can reproduce multiple pictures from the disc by processing information for selecting the output mode of the pictures, and reads location information for the selected pictures on the digital video disc with an optical pick-up. When the optical pick-up reads picture information location and outputs the read picture information in series, the digital video disc player separates the picture information in parallel, reproduces the separated picture information, and then converts the reproduced picture information into analog picture signals according to an output mode selected by a user.

BRIEF DESCRIPTION OF THE DRAWINGS

A more complete appreciation of this invention, and many of the attendant advantages thereof, will be readily apparent with reference to the following detailed description when considered in conjunction with the accompanying drawings, in which like reference symbols indicate the same or similar components, wherein.

DETAILED DESCRIPTION OF THE PREFERRED EMBODIMENT(S)

Reference will now be made in detail to a preferred embodiment of the present invention, an example of which is illustrated in the accompanying drawings. Many particular details appear in the following description and are provided for a comprehensive view of the present invention. It is obvious for a person having common knowledge on this technology that the present invention can be embodied without using the specific details set forth in the following description. In describing the present invention, detailed descriptions have been omitted where such a description would unnecessarily obscure the present invention.

Figure 4:
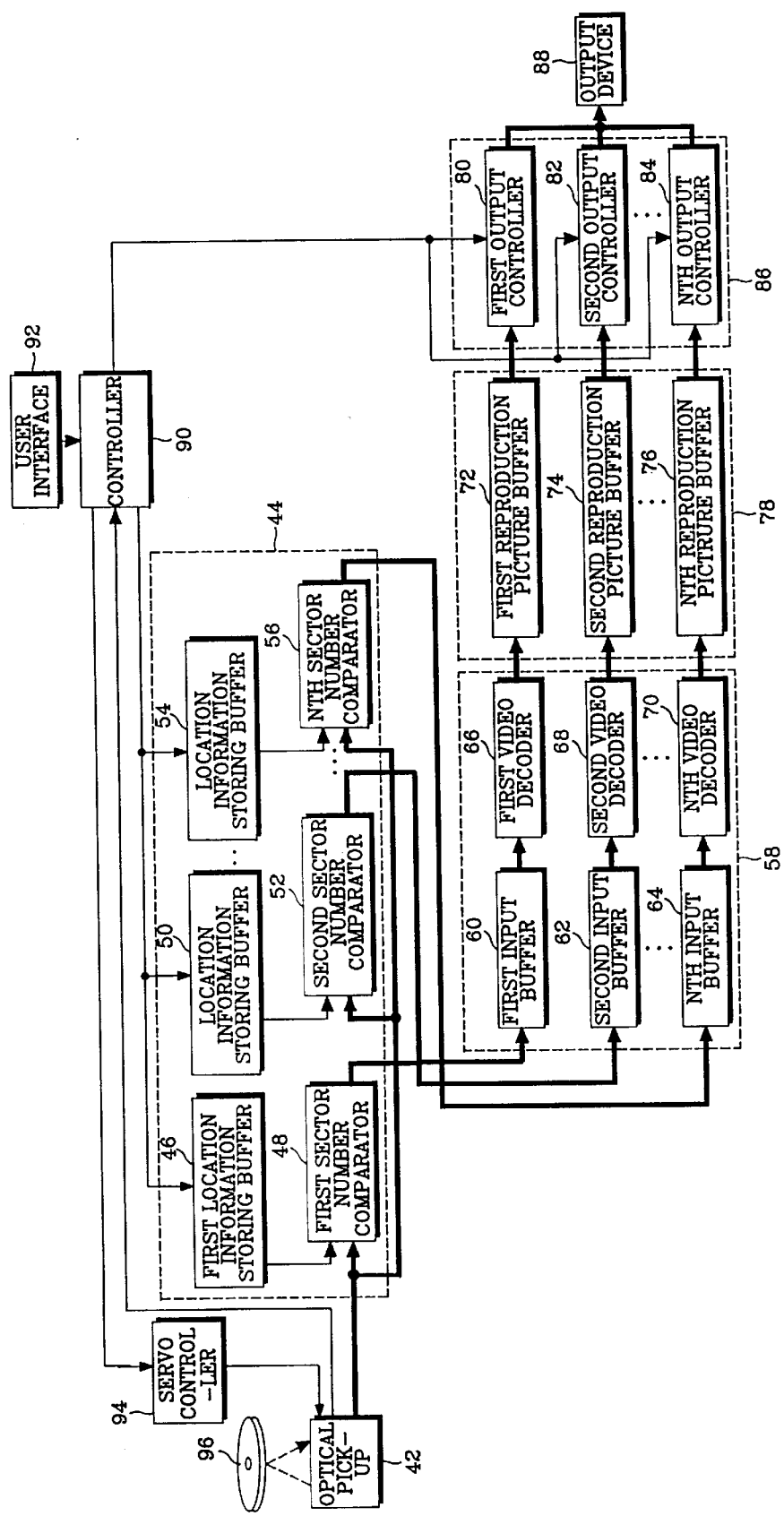
FIG. 4 is a block diagram of a multi-picture processing digital video disc player according to a preferred embodiment of the present invention.

FIG. 4 is a block diagram of a multi-picture processing digital video disc player according to a preferred embodiment of the present invention. Referring to FIG. 4, a controller 90, which would typically be a microcomputer, controls a servo controller 94, multi-data controller 44 and multi-output controller 86, according to a signal from a user interface 92. User interface 92 displays a menu from which the user can select various functions of the disc player for output device 88. The user uses the displayed menu to select desired functions with a remote control.

When the user selects multiple pictures from those recorded on the medium and a multiple picture output mode, the digital video disc player displays multiple pictures using conventional picture in picture (PIP) techniques Specifically, if the user wants to watch first and second pictures as a main picture and a sub-picture, respectively, the user selects the first and second picture outputs. The first picture is selected as a main picture output, and the second picture being as a sub-picture output. Here, the main picture signifies a larger picture when the pictures are output in the PIP mode, and the sub-picture signifies a smaller picture shown in the larger picture. The picture and mode selection information is applied to controller 90 since controller 90 controls multi-data controller 44, servo controller 94 and multi-output controller 86 in order to reproduce the selected pictures.

Figure 5:
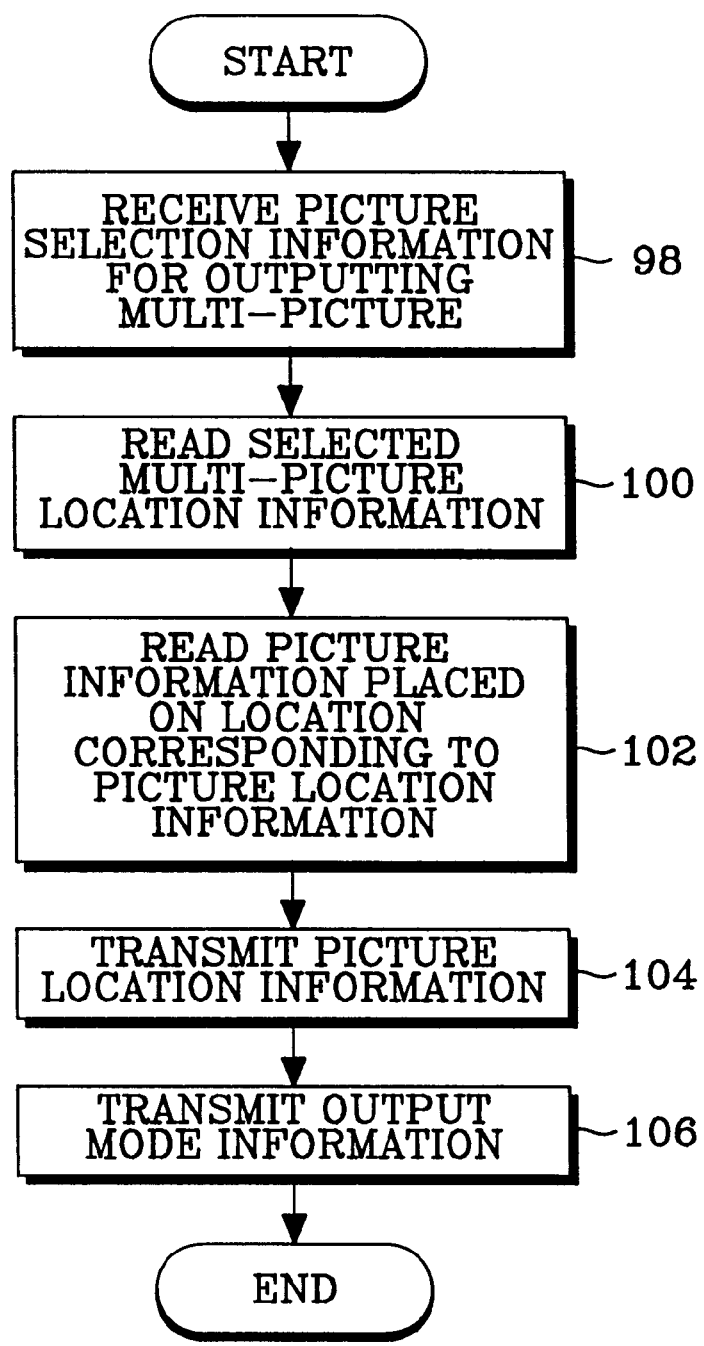
FIG. 5 is a flow chart showing the process of reproducing pictures with the multi-picture processing digital video disc player according to the preferred embodiment of the present invention.

FIG. 5 shows a process of controlling multi-data controller 44, servo controller 94 and multi-output controller 86 according to the user's selections. Referring to FIGS. 4 and 5, the user inputs a picture selection information for outputting multiple pictures to be displayed simultaneously through user interface 92. The picture selection information is transmitted to controller 90. When the transmission is completed, controller 90 performs a step 98. At step 98, controller 90 receives picture selection information for multiple pictures. Then, controller 90 carries out a step 100. At this step, controller 90 reads the picture recording location information sections to get information regarding the location of the required picture data.

Next, controller 90 sends the instruction for reading the picture information located on a portion corresponding to the picture location information to servo controller 94 at a step 102. Thereafter, controller 90 transmits the picture location information to multi-data controller 44 at a step 104. When the transmission is completed, controller 90 transmits output mode information according to the output mode of the picture information to multi-output controller 86 at a step 106.

The operation of servo controller 94, multi-data controller 44, multi-output controller 86, optical pick-up 42 and multi-video decoding portion 58 will be explained below in detail. When the user selects the first and second picture outputs as the sub-picture and main picture using interface 92, controller 90 reads the picture recording location information section on digital video disc 96 in order to read the picture location information of coded first picture information. Based on received location information from the pick up, controller 90 transmits the reading instruction to servo controller 94.

Figure 1:
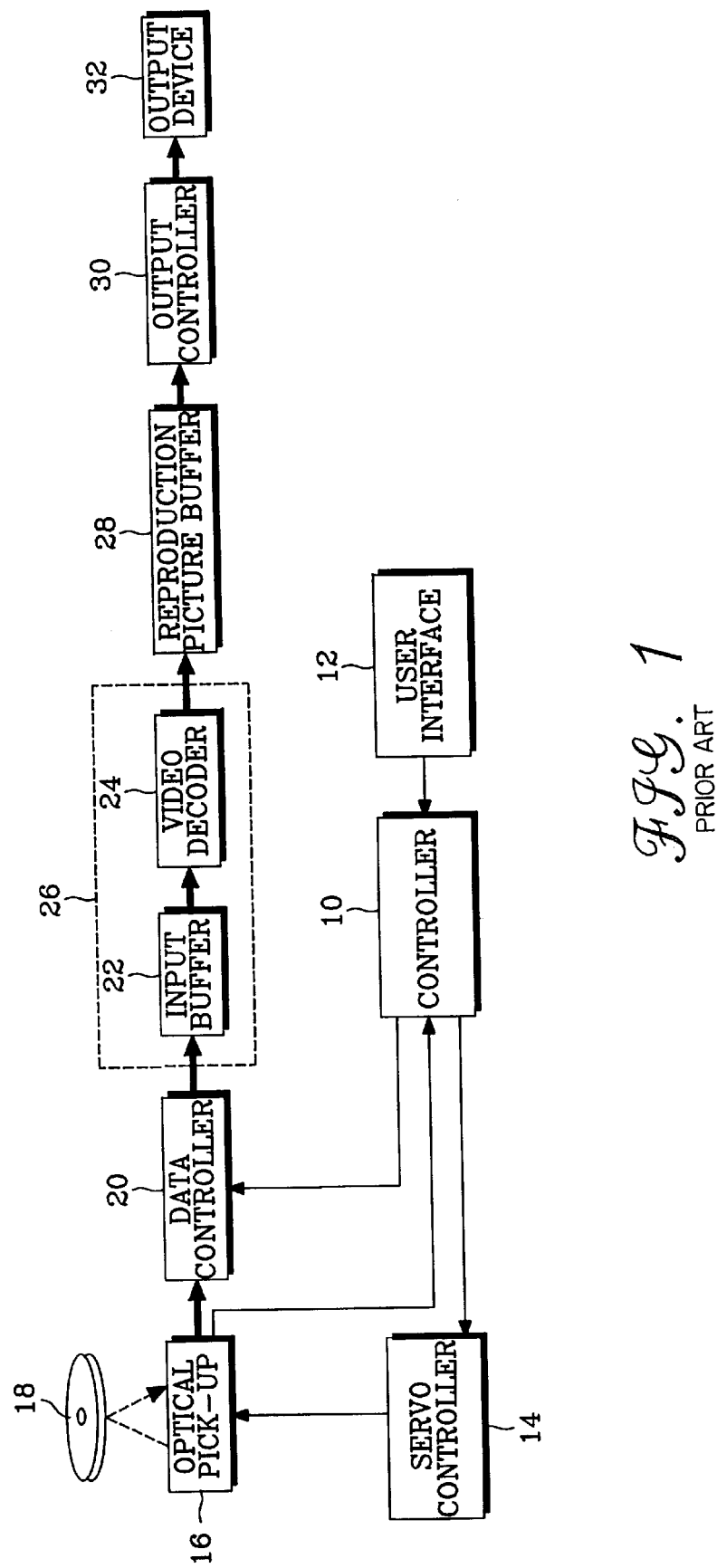
FIG. 1 is a block diagram of a conventional digital video disc player.
Figure 2:
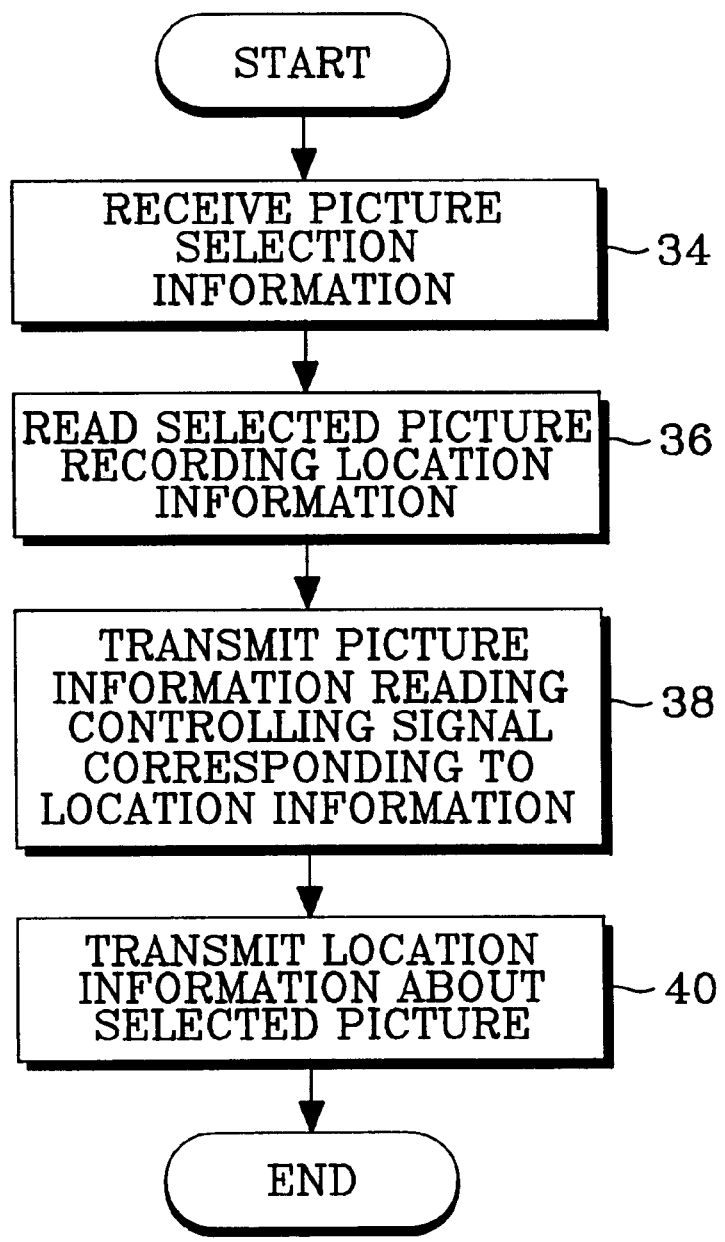
FIG. 2 is a flow chart showing a process of reproducing pictures in a conventional digital video disc player.
Figure 3:
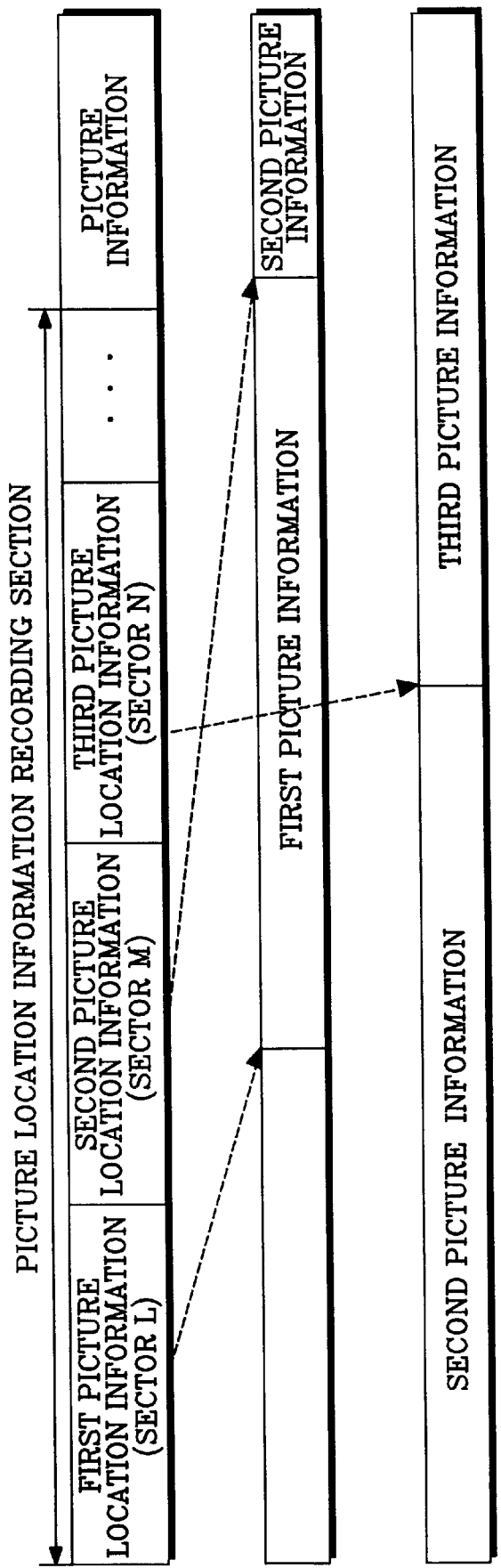
FIG. 3 shows the structure of information recorded on a digital video disc.

Servo controller 94 drives optical pick-up 42 according to the reading instruction, and optical pick-up 42 reads the picture recorded location information section. As shown in FIG. 3, for example, the first picture recording location is sector L, and the second picture recording location is sector M. The location information, that is, sectors L and M, is sent to controller 90. Controller 90 supplies the instruction for reading sectors L and M to servo controller 94. Servo controller 94 reads the first and second picture information recorded in sectors L and M, by driving optical pick-up 42 according to the reading instruction. The read first and second picture data is sent to multi-data controller 44.

Multi-data controller 44 consists of first, second, ..., Nth location information storing buffers 46, 50 and 54, and first, second, ..., Nth sector number comparators 48, 52 and 56. Location information storing buffers 46, 50 and 54 buffer the picture location information from controller 90. Since the user wants to watch the first and second pictures, the information about locations on which the first and second pictures are recorded, that is, sectors L and M are sent to first and second location information storing buffers 46 and 50 of multi-data controller 44.

At this time, optical pick-up 42 sends the first and second picture information to sector number comparators 48, 52 and 56. Sector number comparators 48, 52 and 56 compare the location information buffered in location information storing buffers 46, 50 and 54 to the location of information from optical pick-up 42. If the location information corresponds to the recording location, sector number comparators output the picture information.

The picture information output from optical pick-up 42 are first and second picture information, and the first and second picture information are output on one line in series. These outputs are applied to sector number comparators 48, 52 and 56. Sector number comparators 48, 52 and 56 receive the location information from buffers 46, 50 and 54. Since sectors L and N are buffered in only first and second location information storing buffers 46 and 50, sectors L and M are applied to first and second sector number comparators 48 and 52, respectively.

Since the first picture information corresponds to sector L, first sector number comparator 48 outputs the first picture information. Since the second picture information corresponds to sector M, second sector number comparator 52 outputs the second picture information. The sector number comparators other than the first and second sector number comparators do not output the picture information because they do not receive the picture location information for selected pictures. As described above, the picture information output from optical pick-up 42 is in series, but is separated into sets of picture information by multi-data controller 44 and is then transmitted from multi-data controller 44 in parallel.

Simultaneously, the parallel outputs of sector number comparators 48, 52 and 56 are sent to multi-video decoding portion 58 which includes first, second, . . . , Nth video decoders 66, 68 and 70, and first, second, . . . , Nth input buffers 60, 62 and 64 to produce the parallel outputs from the multi-data controller 44. Input buffers 60, 62 and 64 buffer the parallel outputs from multi-data controller 44. The picture information buffered in input buffers 60, 62 and 64 is sent to video decoders 66, 68 and 70, respectively Video decoders 66, 68 and 70 reproduce the picture information, and the picture information reproduced by the video decoders is transmitted to multi-reproduction picture buffer 78 in parallel.

The parallel outputs of multi-data controller 44, which includes the first and second picture information, is buffered in first and second input buffers 60 and 62, respectively The buffered first and second picture information is output to first and second video decoders 66 and 68, and reproduced by them The first and second picture information reproduced by video decoders 66 and 68 is sent to multi-reproduction picture buffer 78.

Multi-reproduction picture buffer 78 consists of first, second, . . . , Nth reproduction picture buffers 72, 74 and 76, to buffer the reproduced picture information that was received in parallel. The buffered picture information is fed to multi-output controller 86 in parallel. That is, the reproduced first and second picture information is buffered in first and second picture buffers 72 and 74, and then fed to multi-output controller 86 in parallel.

Multi-output controller 86 consisting of first, second, . . . , Nth output controllers 80, 82 and 84 convert the pictures they receive into analog picture signals which are displayed on output device 88 according to a predetermined output mode. The analog picture signals are transmitted to output device 88 to produce a picture display. In this example, the output mode is such that the first and second pictures are output as the main picture and sub-picture, respectively. First output controller 80 receives the first picture information, and converts it into an analog picture signal for generating the main picture. Second output controller 82 receives the second picture information, and converts it into an analog picture signal for generating the sub-picture. First and second controllers 80 and 82 send two analog picture signals to output device 88, and output device 88 displays the pictures corresponding to two analog signals. The multiple pictures from multi-output controller 86 and output device 88 occur in the PIP mode which is widely used. Thus, a detailed description about of the PIP device will be omitted.

As described above, the present invention simultaneously processes and displays the picture information on the digital video disc according to the chosen pictures and output mode selected by the user. Accordingly, the user can watch the multiple pictures simultaneously and conveniently Moreover, since the pictures recorded at various angles are simultaneously provided, a vivid picture can be obtained. Other multiple image or single image display formats may also be implemented.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A digital video disc player operable to simultaneously produce multiple pictures from a digital video disc which is recorded with multiple picture information and multiple picture location information in multiple sectors, said digital video disc player comprising:

an optical pick-up for reading the information recorded on the digital video disc;

a servo controller for controlling the optical pick-up;

a user interface operable to receive a first picture selection input by a user and a separate second picture selection input by a user as picture selection information, said first and second picture selections corresponding to picture location information sectors of the disc which are logically unrelated to each other, the picture selection information also including an output mode of the first and second picture selections to simultaneously output said first and second picture selections;

a controller for receiving the picture selection information, for controlling the servo controller to read the picture information of selected respective first and second picture selections from the picture locations of the optical disc via the optical pick up, and for receiving the picture location information from the optical pick up;

a multi-data controller for receiving the picture location information from the controller, separating picture information from the optical pick-up into multiple pieces of picture information for said first and second picture selections corresponding to the picture location information, and outputting the separated picture information in parallel;

a multi-video decoding portion for receiving the separated parallel picture information from the multi-data controller and reproducing it; and a multi-output controller for receiving the parallel picture information reproduced by the multi-video decoding portion, for converting the parallel picture information to analog picture signals, and for generating multiple pictures according to the output mode, and for providing the analog picture signals to an output device, the output device displaying multiple pictures.

2. The digital video disc player as claimed in claim 1, wherein the output device displays the multiple pictures using a picture-in-picture format.

3. A digital video disc player, operable to simultaneously produce multiple pictures from a digital video disc which is recorded with multiple picture information and multiple picture location information, said digital video disc player comprising:

an optical pick-up for reading the information recorded on the digital video disc;

a servo controller for controlling the optical pick-up;

a user interface for receiving multiple picture selections input by a user as picture selection information the picture selection information also including an output mode of the multiple picture selections;

a controller for receiving the picture selection information, for controlling the servo controller to read the picture information of selected pictures from the picture locations of the optical disc via the optical pick up, and for receiving the picture location information from the optical pick up;

a multi-data controller for receiving the picture location information from the controller, separating picture information from the optical pick-up into multiple pieces of picture information corresponding to the picture location information, and outputting the separated picture information in parallel;

a multi-video decoding portion for receiving the separated parallel picture information from the multi-data controller and reproducing it; and a multi-output controller for receiving the parallel picture information reproduced by the multi-video decoding portion, for converting the parallel picture information to analog picture signals, and for generating multiple pictures according to the output mode, and for providing the analog picture signals to an output device, the output device displaying multiple pictures, wherein the multi-data controller comprises:

a plurality of location information buffers for storing the picture location information from the controller; and a plurality of location information comparators for comparing the location information buffered in the buffers with the picture location information received from the optical pick-up in series, and outputting the picture information received from the optical pick-up when the buffered location information matches the picture location information received from the optical pick up, each of the location information comparators corresponding to a respective one of the location information buffers.

4. The digital video disc player as claimed in claim 3, wherein the multi-video decoding portion comprises:

a plurality of input buffers for buffering the picture information output from the location information comparators, each of the input buffers corresponding to a respective one of the location information comparators; and a plurality of video decoders for receiving the picture information buffered in the input buffers, and reproducing the picture information, each of the video decoders corresponding to a respective one of the input buffers.

5. The digital video disc player as claimed in claim 4, wherein the multi-output controller comprises:

a plurality of output controllers, each of the output controllers corresponding to a respective one of the plurality of video decoders, for receiving the picture information from the video decoders, and converting the picture information into analog picture signals according to the output mode information.

* * * * *